US008080346B2

(12) United States Patent
Crumm et al.

(10) Patent No.: US 8,080,346 B2
(45) **Date of Patent: *Dec. 20, 2011**

(54) CURRENT COLLECTOR FOR SOLID OXIDE FUEL CELL TUBE WITH INTERNAL FUEL PROCESSING

(76) Inventors: Aaron T. Crumm, Ann Arbor, MI (US); Christopher J. Reilly, Whitinsville, MA (US); Timothy LaBreche, Ann Arbor, MI (US)

( * ) Notice: Subject to any disclaimer, the term of this patent is extended or adjusted under 35 U.S.C. 154(b) by 358 days.

This patent is subject to a terminal disclaimer.

(21) Appl. No.: 12/430,926

(22) Filed: Apr. 28, 2009

(65) Prior Publication Data

US 2010/0075192 A1 Mar. 25, 2010

Related U.S. Application Data

(63) Continuation-in-part of application No. 10/979,017, filed on Nov. 1, 2004, now Pat. No. 7,547,484.

(51) Int. Cl.
*H01M 8/10* (2006.01)

(52) U.S. Cl. ........................ 429/479; 429/497; 429/508

(58) Field of Classification Search ................. 429/479, 429/497, 508

See application file for complete search history.

(56) References Cited

U.S. PATENT DOCUMENTS 7,695,841 B2 * 4/2010 Crumm et al. ................ 429/423

* cited by examiner

*Primary Examiner* — Jane Rhee

(74) *Attorney, Agent, or Firm* — Dickinson Wright PLLC

(57) ABSTRACT

A solid oxide fuel cell includes a tube, a spacer element, a catalytic substrate and an anode current collector. The solid oxide fuel cell further includes a spacer element disposed within the tube. The solid oxide fuel cell further includes a catalytic substrate disposed within the anode current collector electrically contacting the anode of the tube and providing an electrical current path inside the tube past the catalytic substrate to the inlet opening.

20 Claims, 9 Drawing Sheets

41
46
47
43
32
48
44
40

32

68

132
61
68

CURRENT COLLECTOR FOR SOLID OXIDE FUEL CELL TUBE WITH INTERNAL FUEL PROCESSING

RELATED APPLICATION

This application is a continuation in part of patent application 10/979,017, which claims priority benefit of U.S. provisional patent application No. 60/515,779 filed on Oct. 30, 2003.

GOVERNMENT INTERESTS

This invention was made with government support under contract number DAAD19-01-C-0073, awarded by the U.S. Department of Defense. The government has certain rights in this invention.

FIELD OF THE INVENTION

This invention relates to solid oxide fuel cells and more particularly, to solid oxide fuel cells of lightweight design.

BACKGROUND OF THE INVENTION

A solid oxide fuel cell (SOFCs) is a type of fuel cell which reacts a fuel gas with an oxidant to generate DC electric current. SOFCs comprises an anode, an electrolyte and a cathode, and have been made from a variety of materials and in a variety of geometries. Fuel processing is required to render hydrocarbon fuels (such as propane, butane, etc.) suitable for SOFCs. For example, known designs for fuel processors include those done with a separate external reactor where a catalytic substrate processes a hydrocarbon fuel such as butane ($C_4H_{10}$), propane ($C_3Hs$) or diesel fuel (JP-8 or JET-A) to a suitable fuel gas such containing carbon monoxide (CO) and hydrogen ($H_2$). CO and Hydrogen gas are then oxidized at an active area of a SOFC to carbon dioxide and water, with DC current generated. Non hydrocarbon fuels such as ammonia ($NH_3$) can also be transformed into SOFC fuel using one or more catalytic reactions.

It has become desirable to make solid oxide fuel cells as light as possible so that they may serve as a portable power source. An external reactor is bulky and is accompanied with significant inefficiencies in transfer of hot processed fuel gas from the reactor to the active area of the fuel cell. U.S. Patent Publication 10 2003/0054215 to Doshi et al discloses a stack of fuel cell plates where a catalytic substrate is positioned within the plates and within a thermal enclosure. However, such stack designs are known to have problems with thermal cycling, they cannot be heated and cooled quickly, and extensive seals have to be used, including seals subjected to high thermal loading. Further, hot seals have to be used at locations inside the thermal enclosure, and hot seals are expensive. Addressing all of these problems makes such stacked plate designs relatively expensive. It would be desirable to provide a solid oxide fuel cell of a simple, and lightweight design which is also robust in construction and capable of withstanding thermal cycling.

SUMMARY OF THE INVENTION

In accordance with exemplary embodiment, a solid oxide fuel cell includes a tube, a spacer element, a catalytic substrate and an anode current collector. The tube includes an inlet opening, an exhaust opening, an electrolyte, an anode positioned interiorly from the electrolyte, and a cathode positioned exteriorly from the electrolyte. The solid oxide fuel cell further includes a spacer element disposed within the tube. The solid oxide fuel cell further includes a catalytic substrate disposed within the spacer element, the catalytic substrate being configured to receive unreformed fuel and to convert the unreformed fuel to reformed fuel. The solid oxide fuel cell still further includes an anode current collector contacting the anode of the tube and providing an electrical current path inside the tube past the catalytic substrate to the inlet opening.

Figure 1:
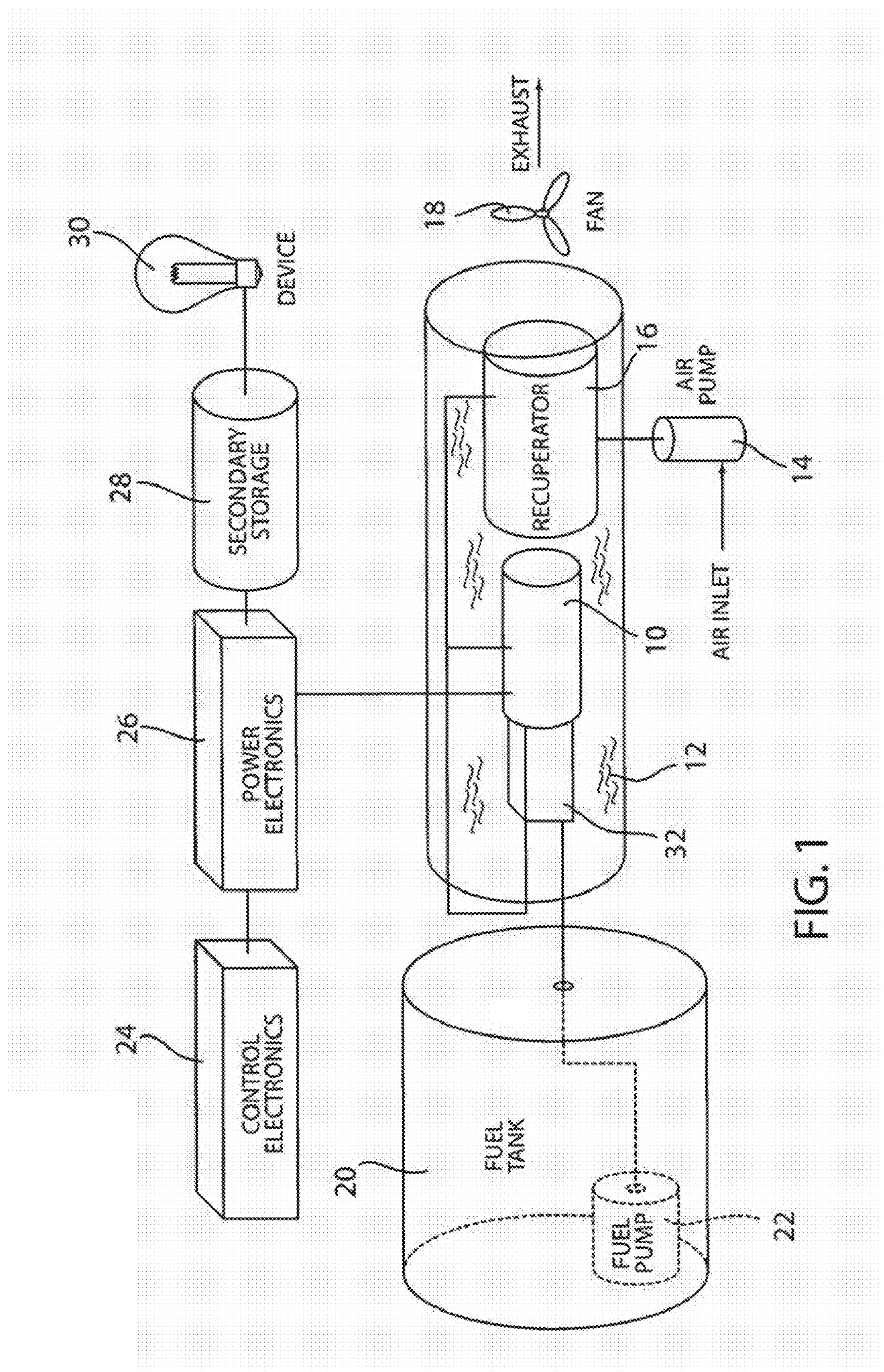
FIG. 1 is a schematic of a solid oxide fuel cell with internal processing in accordance with a preferred embodiment.

It should be understood that the appended drawings are not necessarily to scale, presenting a somewhat simplified representation of various preferred features illustrative of the basic principles of the invention. The specific design features of the solid fuel cell as disclosed here, including, for example, specific dimensions of the catalytic substrate will be determined in part by the particular intended application and use environment. Certain features of the illustrated embodiments have been enlarged or distorted relative to others for visualization and clear understanding. In particular, thin features may be thickened, for example, for clarity of illustration. All references to direction and position, unless otherwise indicated, refer to the orientation of the solid state electrochemical device illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the fuel cells disclosed herein. The following detailed discussion of various alternative and preferred features and embodiments will illustrate the general principles of the invention with reference to an internal reformer suitable for use with a solid oxide fuel cell ("SOFC"). Other embodiments suitable for other applications will be apparent to those skilled in the art given the benefit of this disclosure.

FIG. 1 is a schematic of a solid oxide fuel cell 10 and surrounding componentry in accordance with a preferred embodiment. The fuel cell 10 generates power to run a device 30 or to provide power to a secondary device 28 (such as charging a battery). Control electronics 24 and power electronics 26 may be mounted to control the power generation of the SOFC. A fuel tank 20 contains a fuel (typically butane, propane, diesel, JET-A, etc.) and a fuel regulator or pump 22 delivers the fuel into a thermal enclosure defined by insulation 12. The SOFC 10 generates significant heat during operation (on the order of 600-1000° C.) and is preferably mounted within the thermal enclosure. The SOFC is most efficient at these higher temperatures, and therefore several design features have been incorporated to heat incoming fuel gas and incoming air. For example, an air pump 14 pumps air from a cold air inlet 36 to a recuperator 16. The recuperator is essentially~heat exchanger which transfers some of the heat from exhaust to the incoming air supplied to the cathode. Ambient air for fuel processing is supplied to mix with the fuel in a fuel air mixer 38 in a predetermined ratio, preferably having a sub-stoichiometric quantity of oxygen so that processing of the fuel gas takes place at the catalytic substrate 32 as described in greater detail below. Processing is understood here to mean conversion of a fuel to a gas which can be used by the SOFC 10, typically containing carbon monoxide and hydrogen gas. The heated air circulates along the active area and participates in electrochemically transforming the fuel gas into electricity and exhaust gases.

Figure 2:
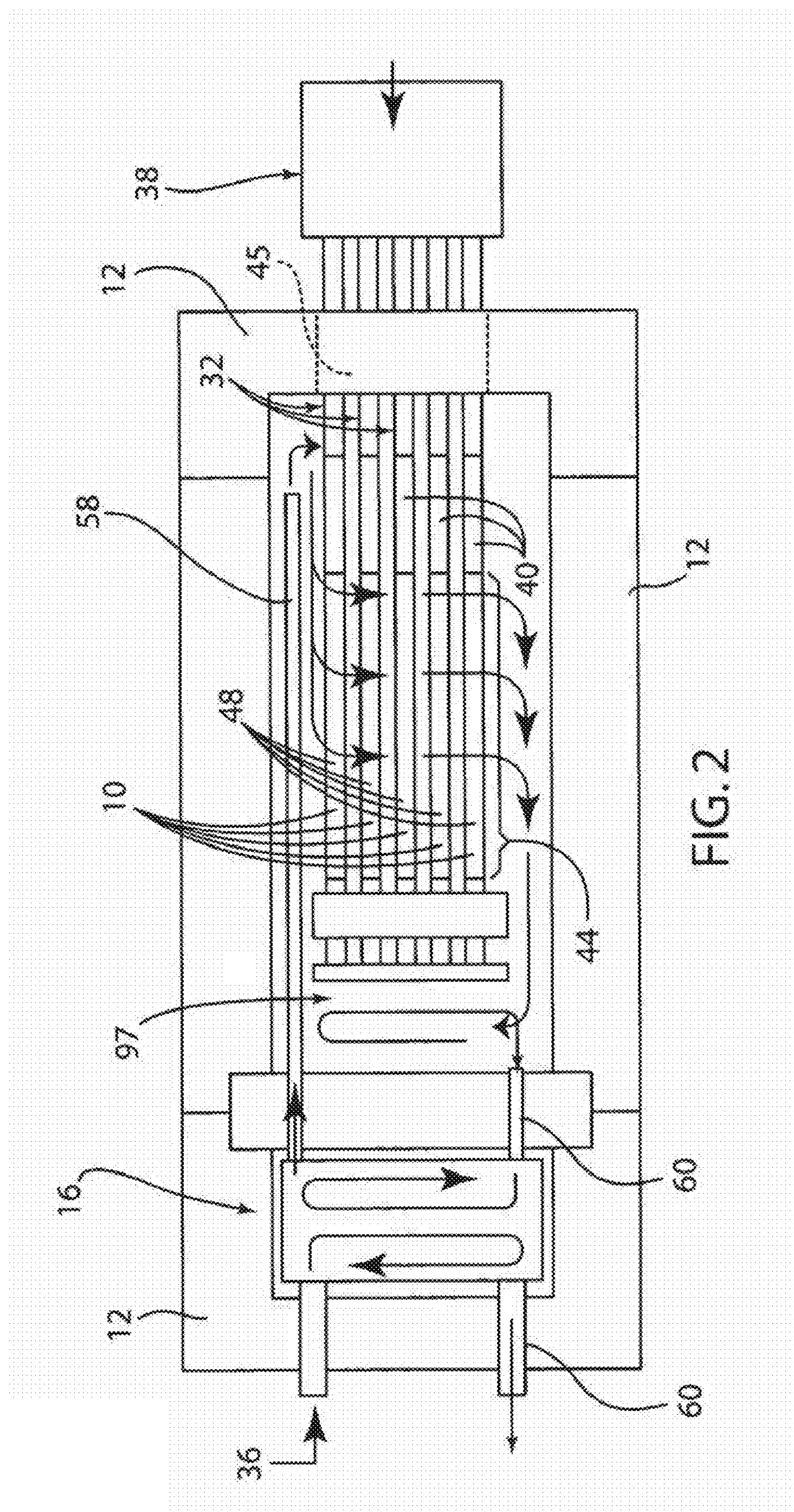
FIG. 2 is a schematic cross section view of the solid oxide fuel cell of FIG. 1.
Figure 3:
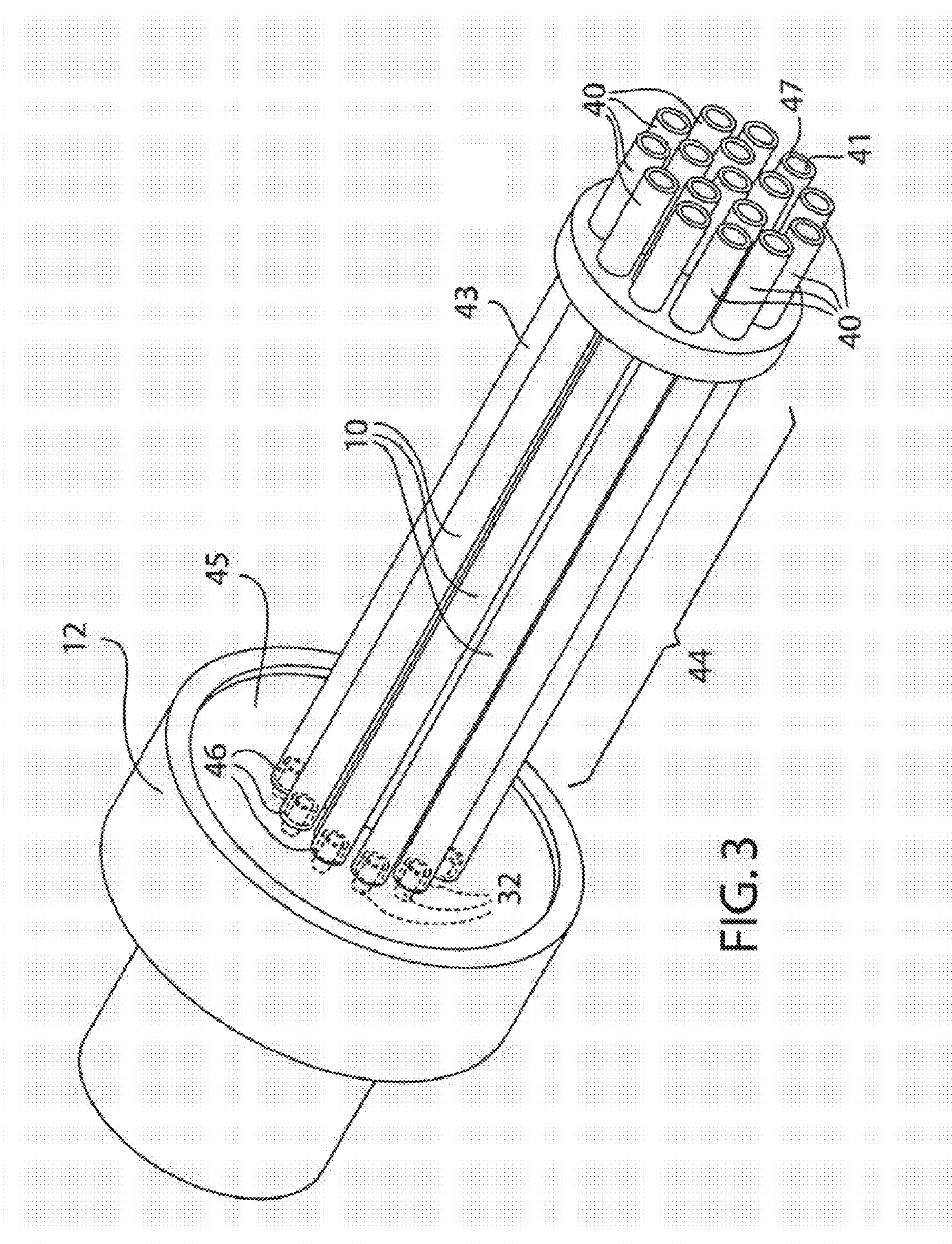
FIG. 3 shows a manifold and a series of SOFC tubes, and the catalytic substrate would preferably be positioned in each tube near the left end.

FIG. 2 shows a schematic of a cross section of the preferred embodiment of the SOFC of FIG. 1, showing the fuel air mixture being introduced into the thermal enclosure through a series of tubes 40. The actual number of tubes depends in part on the desired power output of the SOFC. A plurality of tubes is preferably mounted on a manifold 45, as seen in FIG. 3. Each tube 40 has an interior 41 and an exterior 43 (shown in FIG. 4). Preferably an anode material is positioned on the interior, and an electrolyte 47 exteriorly surrounds the anode. The entire tube 40 may have an interior layer of anode and a layer of electrolyte circumferentially surrounding the anode, so that the anode is remote from the exterior 43 of the tube and the electrolyte is remote from the interior 41 of the tube. A cathode 48 is positioned around the exterior 43 of the tube 40, defining an active area 44, also preferably remote from the interior of the tube. Fuel gas flows from the manifold 45, then to the catalytic substrate, and then to the active area 44 within each tube. The catalytic substrate may be positioned immediately preceding (in terms of fuel gas flow) the active area and within the thermal enclosure so that heat generated at the catalytic substrate helps preheat the fuel gases. That is, air from air inlet 36 passes through the recuperator 16 and is heated by an exhaust stream of gases moving separately through the recuperator. For further heating, the air travels through an air inlet tube 58 past the active areas 44 of the fuel cells to an area generally adjacent the catalytic substrates 32. Residual oxygen in the heated inlet air is used to completely combust any residual fuel in the exhaust stream at the burner region 97. Optionally a catalytic element may be positioned at the burner region to help with combustion. Once the reaction is complete, exhaust gas is routed through exhaust tube 60, through the recuperator 16, and out of the thermal enclosure. Thus, the major inlets and outlets to the thermal enclosure are air inlet 36, fuel gas inlet 38, and exhaust gas outlet 60. Such fuel cell designs are advantageously relatively light in weight, and provide good power density to mass ratios. As an example of a lightweight design each tube 40 can comprise a 1 mm-20 mm diameter tube with at least three layers, an inner layer of anode, a middle layer of electrolyte, and an outer layer of cathode. The anode comprises, for example, a porous cermet of nickel and yttria stabilized zirconia (YSZ). The electrolyte can comprise a thin membrane of YSZ. The cathode can comprise, for example, a porous lanthanum strontium manganate (LSM). An example of a suitable fuel cell tube shaped anode, electrolyte and cathode is disclosed in U.S. Pat. No. 6,749,799 to Crumm et al, entitled METHOD FOR PREPARATION OF SOLID STATE ELECTROCHEMICAL DEVICE and hereby incorporated by reference. Other material combinations for the anode, electrolyte and cathode, as well as other cross section geometries (triangular, square, polygonal, etc.) will be readily apparent to those skilled in the art given the benefit of this disclosure. In accordance with a highly advantageous feature, the catalytic substrate 32, which partially oxidizes the fuel gas, is positioned inside the tube, advantageously eliminating the need and expense of an external processing device. Moreover, significant heat is generated at the catalytic substrate 32 when a fuel gas is introduced, and this heat is useful in increasing the temperature of the gases to a level where the fuel cell is more efficient in generating electrical power.

Figure 5:
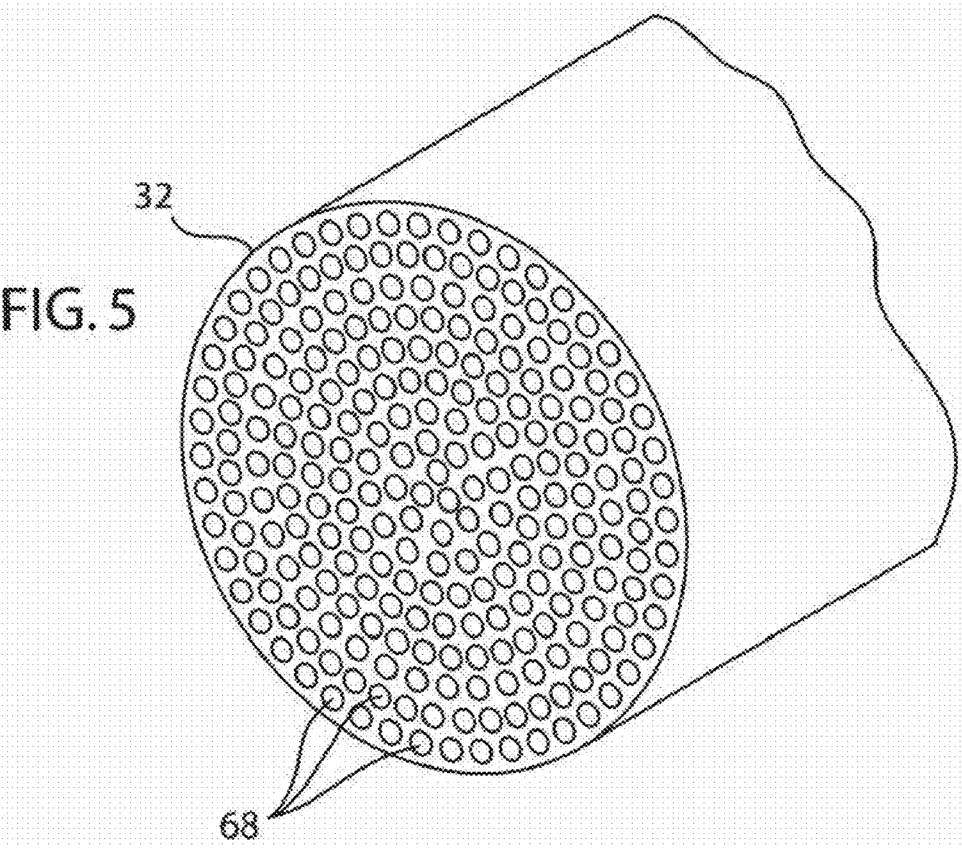
FIG. 5 is a side view of the catalytic substrate showing a honeycomb cross-section.

The catalytic substrate 32 can comprise, for example, particles of a suitable metal such as platinum or other noble metals such as palladium, rhodium, iridium, osmium, or their alloys. Other suitable materials for use as a catalytic substrate can comprise oxides, carbides, and nitrides. The catalytic substrate may comprise a wire, a porous bulk insert of a catalytically active material, or a thin "ribbon" which would have the effect of increasing the ratio of surface area to volume. In the preferred embodiment shown in FIG. 5, the catalytic substrate 32 comprises a supported catalyst. Supported catalysts consist of very fine scale catalyst particles supported on a substrate made of, for example a ceramic such as aluminum oxide. Preferably the catalytic substrate is honeycomb shaped, provided with a series of openings 68 which the fuel gas passes through as it is processed. The outer diameter of the honeycomb catalytic substrate is smaller than the inner diameter of the of SOFC tube 40. The honeycombed catalytic substrate may also be provided with spaces through which any current collector wires may pass. Other materials suitable for use as a catalytic substrate will be readily apparent to those skilled in the art given the benefit of this disclosure.

The catalytic substrate 32 is shown in FIGS. 1-2 positioned inside the thermal enclosure defined by the insulation 12. FIG. 3 shows the insulation 12 removed showing tubes 40 of the SOFC bundled together by manifold 45. In this manner, a series of tubes can be assembled together into a close fitting compartment surrounded by insulation 12. In this manner, cold hydrocarbon fuel and oxygen advantageously can be introduced to the SOFC through tubes closed off at the manifold with conventional or "cold seals" such as adhesives and sealants.

Figure 6:
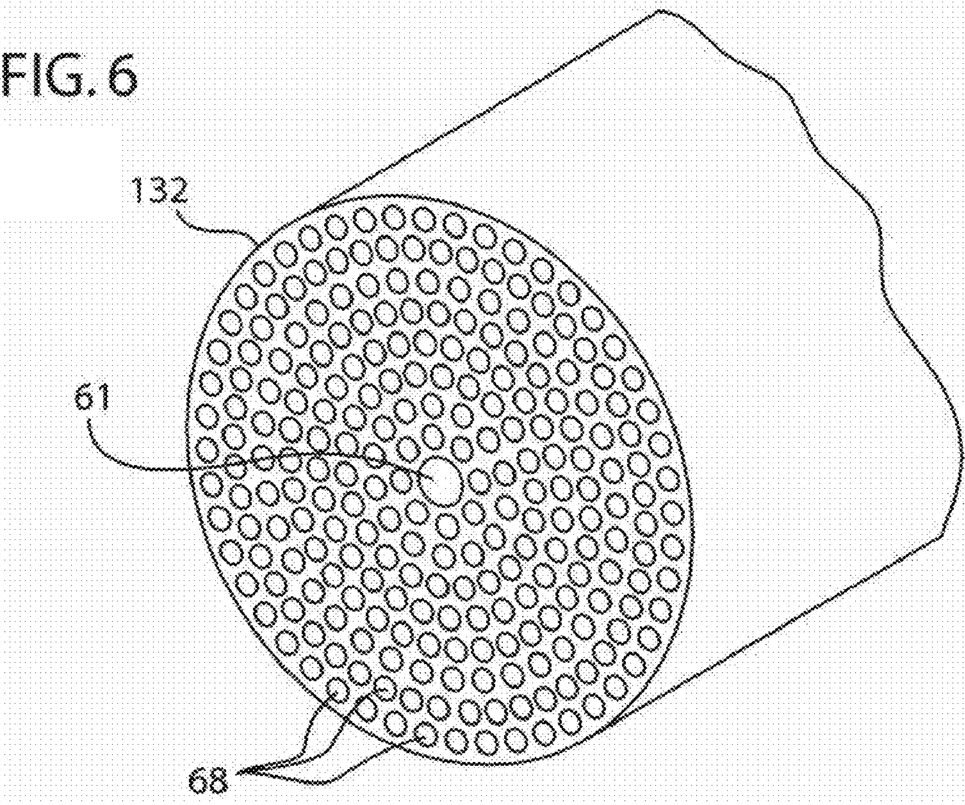
FIG. 6 is an alternate preferred embodiment of a catalytic substrate showing an internal opening for a current collector.

Current collectors may be mounted within and around the tubes 40, preferably at or near the active area 44 to capture electric current generated when the fuel gases are completely oxidized. FIG. 6 shows an alternate preferred embodiment of a tube-shaped catalytic substrate 132 where an opening 61 may be provided to receive a current collector. Alternatively, a packed bed of catalytic substrate beads may be used, with the beads either arranged in an orderly fashion or randomly packed.

Figure 4:
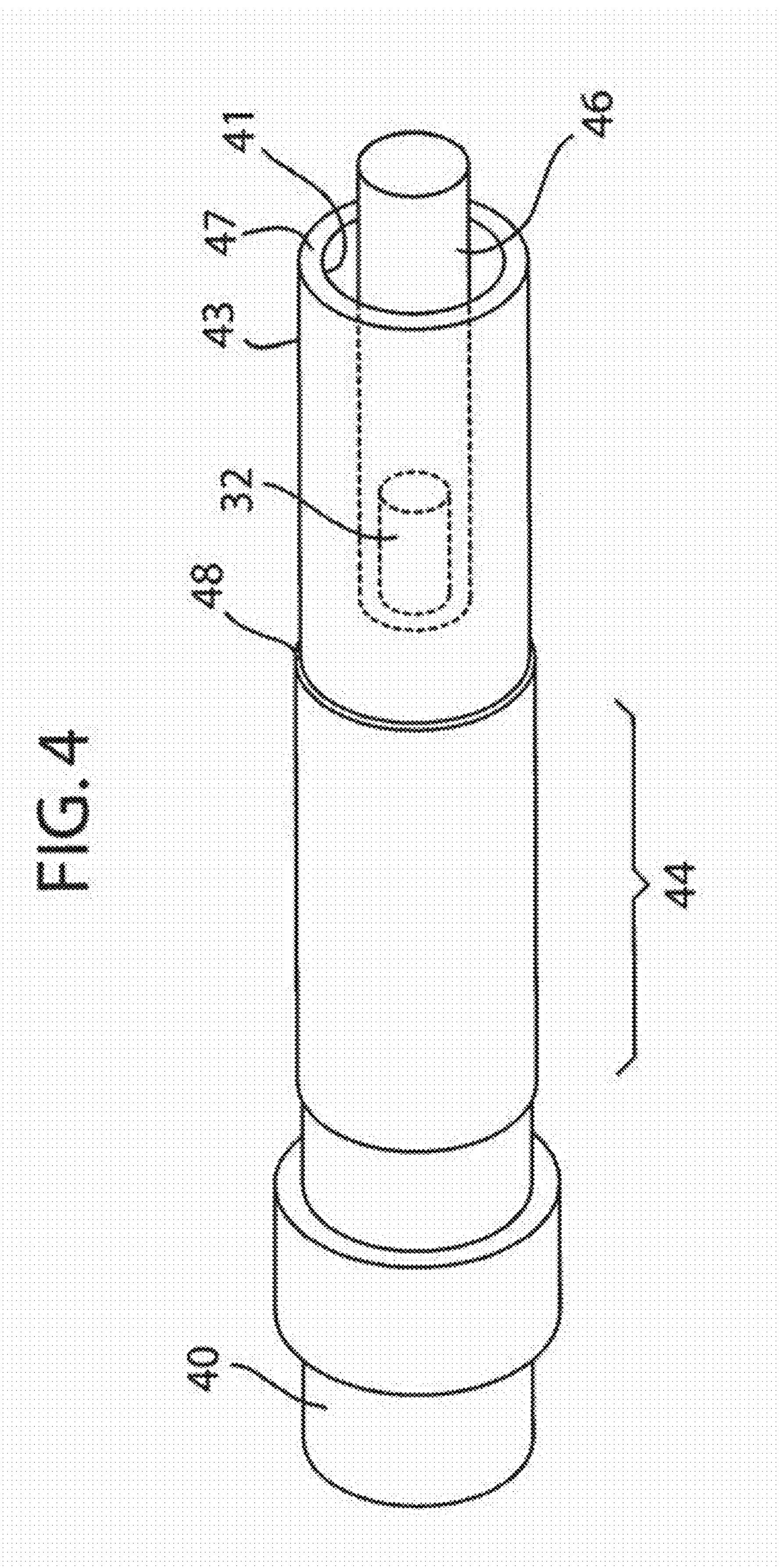
FIG. 4 shows a schematic of a single tube with a catalytic substrate and a space element positioned between the SOFC tube and the catalytic substrate.

FIG. 4 shows a single tube 40. Extending along the entire length of the tube 40 along its interior 43 is the anode, and extending circumferentially around the anode is the electrolyte. Advantageously, the cathode need only be positioned at the active area 44, shown in FIG. 4 positioned circumferentially around at least part of the tube. The catalytic substrate 32 is positioned within the tube and spaced apart from the active area. In accordance with a highly advantageous feature, a spacer element 46 is provided which physically isolates the catalytic substrate 32 from the tube 40. This is advantageous in that when fuel passes through the catalytic substrate, significant heat is generated. Spacer element helps thermally isolate the tube, thereby reducing heat shock and related stresses. In a preferred embodiment the spacer element has a fixed end and a free end, and is mounted to the tube 40 at the fixed end. The catalytic substrate is positioned near the free end. The spacer element 46 can comprise, for example, a metal such as stainless steel or a ceramic such as zirconia or alumina. Other compositions for the spacer element will be readily apparent to those skilled in the art given the benefit of this disclosure.

Advantageously, the internal catalytic substrates can be combined with different compositions in series to effect controlled ignition, thermal distribution and reaction, as desired. A fuel mixture consisting of one or more of water vapor, fuel, and oxygen can first pass over a catalytic substrate which partially oxidizes a portion of the fuel to create a hot mixture of the remaining fuel, and one or more of partially reformed fuel, hydrogen, carbon dioxide, carbon monoxide, and water. The heated fuel-water from the partial oxidation reaction could then undergo endothermic steam reforming in a downstream internal reactor or across the same reactor (tube) to produce a desired reformed fuel.

This type of fuel processing is known as autothermal reforming. Alternatively, a suitable mixture of fuel and water vapor used in combination with one or more catalytic substrates may be used to transform a hydrocarbon into a desired reformed fuel. Additional catalytic materials may be applied to promote a 'water gas shift' reaction which would enrich the hydrogen content of a fuel gas stream.

Figure 7:
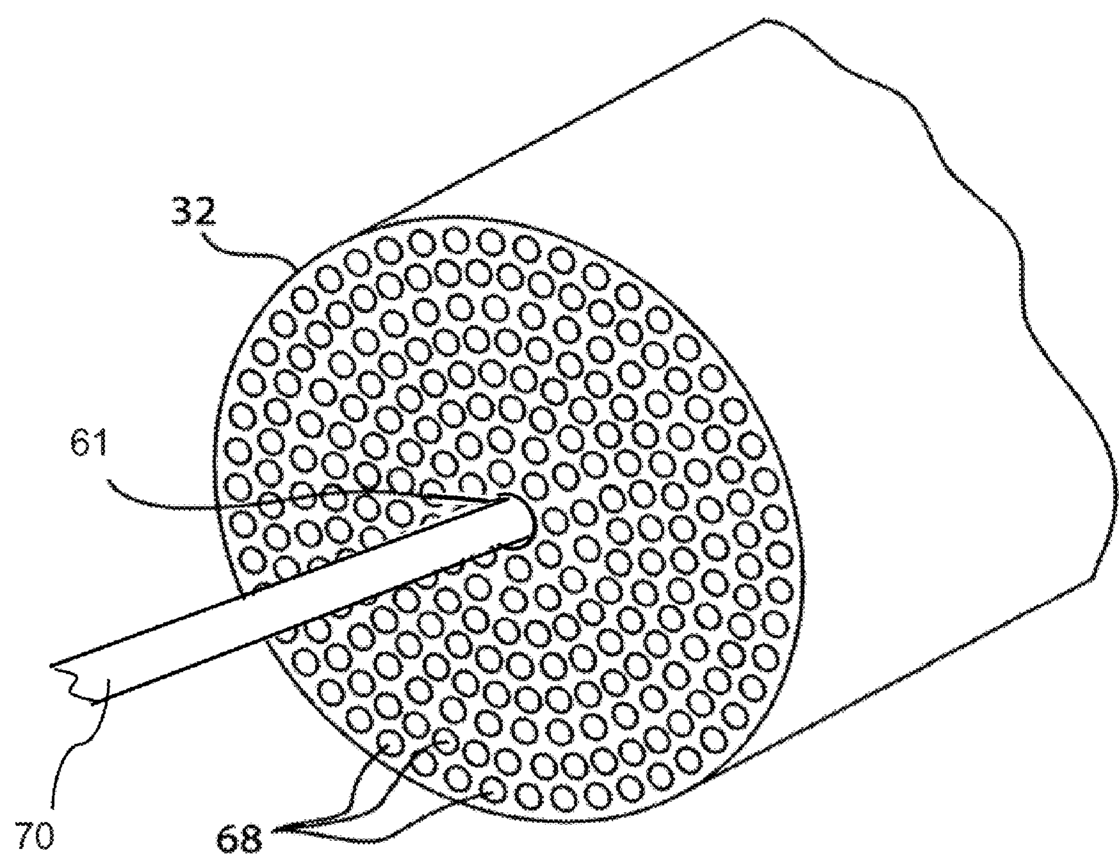
FIG. 7 depicts the catalytic substrate of FIG. 6 having a current collector disposed therethrough.
Figure 8A:
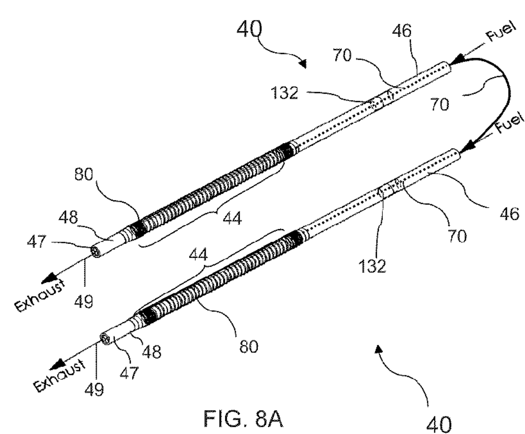
FIG. 8A. shows a plurality of tubes in accordance with an exemplary embodiment.
Figure 8B:
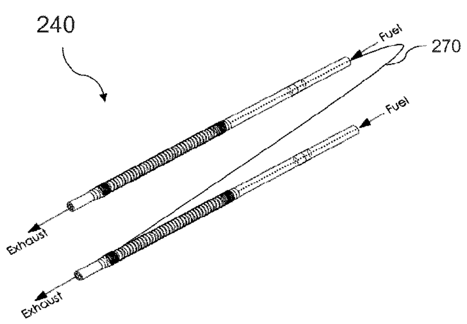
FIGS. 8B and 8C show a plurality of tubes in accordance with alternate embodiments.
Figure 8C:
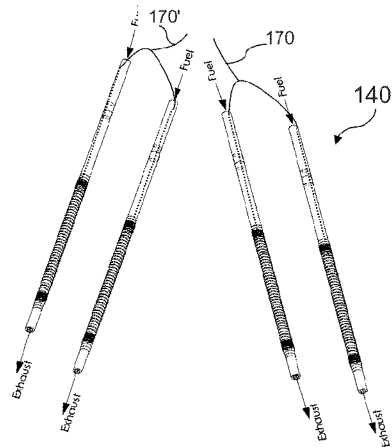

FIG. 7 shows the substrate 132 with the opening 61 receiving a current collector 70, therethrough. FIG. 8A shows multiple tubes (tubes 40) comprising an anode 49, the electrolyte 47, and the cathode 48 disposed on a portion of the electrolyte 47 defining an active area 44. A cathode current collector is wrapped around an exterior of the tube 80 a length of the active area 44. FIG. 8B shows multiple tubes (tubes 140) in which is a current collector 170 electrically connects the tubes 140 in separate bundles in a parallel connection. In one embodiment, electrical current being supplied to each bundle of cells can be controlled separately by utilizing a diode, switch or other electric circuit component. FIG. 8C shows multiple tubes (240) in which a current collector 170 electrically connects the tubes 240 in a series connection such that an anode of a first fuel cell tube is connected to a cathode of a second fuel cell tube.

Figure 9:
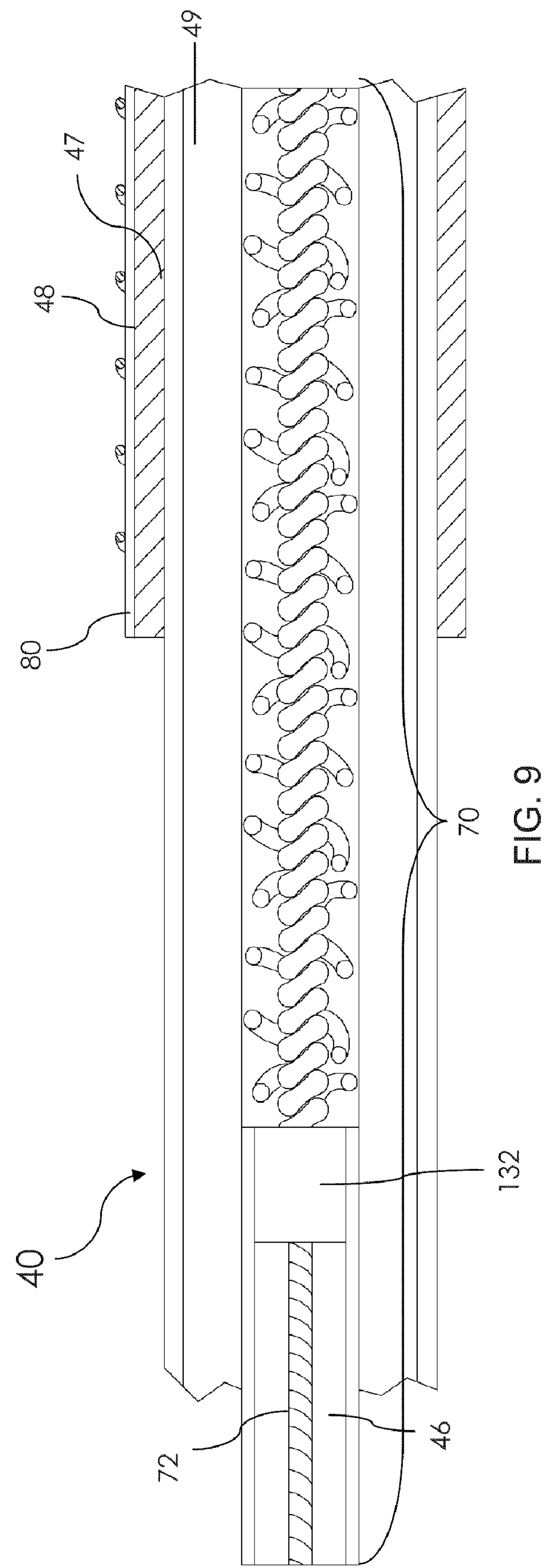
FIG. 9 shows a cross-section of a tube in accordance with an exemplary embodiment.

FIG. 9 shows a cross-section of the tube 40. The anode current collector 70 includes an elongated portion 72 and a brush portion 74. The elongated portion 72 is relatively narrow in diameter and extends through the catalytic substrate 132 and an inner length of the spacer element 46.

The exemplary brush portion 74 comprises a wire brush having an inner core 101 and a plurality of loop members 102 extending therefrom. The inner core 101 functions as an arterial electrical conduit providing current conduction the length of the brush portion 74. The loop members have resilient properties and overall diameter of the anode current collector 74 can be set so that the loop members 102 are compressed against an inner wall of the fuel cell tube 40 proximate the active portion 44. Continuous lengths of compressed loop members 102 contact the anode 49 of the fuel cell tube 18 to promote electrical contact with the anode 49. The anode current collector 70 remains mechanically complaint allowing the anode current collector 74 to distribute forces created by mechanical and thermal expansion stresses so that the brush portion 74 maintains contact with the anode layer 49.

The loop members route electrons relatively short distances between the anode layer 49 and the inner core 101. The loop members 102 have space therebetween to allow fuel to pass between the loop members. In one embodiment, the loop members provide a calibrated cross section to provide a selected amount of backpressure. The anode current collector 74 comprises an electrically conductive metal. Since the anode current collector 74 brush members is positioned in fuel gas and in processed fuel gas, the anode current collector 74 is formed from material that maintains conductivity in the operating environment of the inner chamber of the fuel cell tube 40. In alternate embodiments, other current collector designs can be utilized including current collectors with a brush member comprising bristle members or other shapes contacting the anode 48. Exemplary materials for the anode current collector include stainless steel, copper and copper alloys, silver and silver alloys, and nickel and nickel alloys.

The tubes 40 have the current collectors 70 extending from active areas 40 of tubes 80 through the substrate 132, through the spacer elements 46 and exiting a fuel inlet ('FUEL') of the spacer element 46. Anodes of individual tubes can be electrically connected to each other by the current collector 70.

Figure 10:
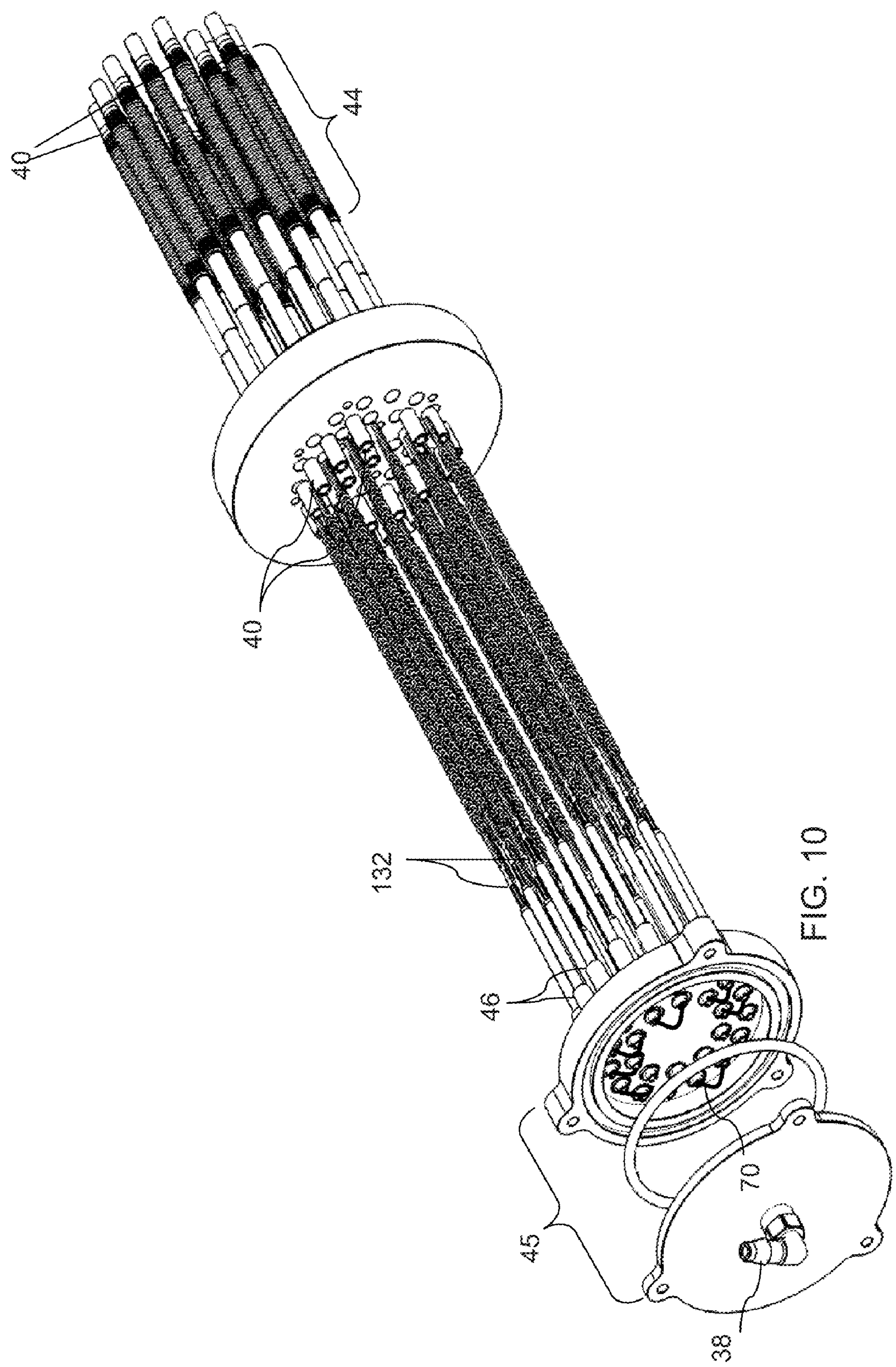
FIG. 10 shows a manifold and a plurality of SOFC tubes in accordance with an exemplary embodiment.

FIG. 10 shows an exploded prospective view of the fuel cell 10. The manifold 45 includes a faceplate 39 comprising an air and fuel inlet 37, a ring member 41, and a base portion 43. The faceplate 39 can form a gas-tight seal with the base portion 43 with the ring member disposed therebetween such that fuel can routed between from the fuel inlet 37 to a gas-tight inner chamber defined by the face plate 39 and the base portion 43. The term gas-tight as used herein is used to refer substantially preventing fluid flow circumferentially out of the inner chamber, thus the inner chamber routes substantially all fluid from the air and fuel inlet 37 through the inner chamber to the plurality of spacer 46. The base portion 43 further includes connection members 47 to further provide a seal between the inner chamber and the spacers 46. The fuel cell system 10 further includes a support member 41 having tubes 40 routed therethrough.

During assembly, the elongated portion 74 of the current collectors 40 can be disposed though the opening of the catalytic substrate 132 inside the spacer elements, routed through the interior of the spacer elements, and electrically connected to each other at the manifold. The anode current collector 70 and the spacer members 46 can be inserted into the tubes 40 and the spacer members 46 can be sealed to fuel cell tube utilizing a sealant, for example a ceramic sealant or a silicon based sealant, (not shown) disposed around an exterior spacer members 46.

The catalytic substrates disclosed herein are advantageous in that they may be used, in any of the aforementioned processes where a catalytic agent is required to accelerate a reaction. From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A solid oxide fuel cell comprising:

a tube comprising an inlet opening, an exhaust opening, an electrolyte, an anode positioned interiorly from the electrolyte, and a cathode positioned exteriorly from the electrolyte;

a spacer element disposed within the tube;

a catalytic substrate disposed within the spacer element, the catalytic substrate being configured to receive unreformed fuel and to convert the unreformed fuel to reformed fuel; and an anode current collector contacting the anode of the tube and providing an electrical current path inside the tube past the catalytic substrate to the inlet opening.

2. The solid oxide fuel cell of claim 1, wherein the catalytic substrate defines an opening and wherein the anode current collector is received through the opening of the catalytic substrate.

3. The fuel cell system of claim 1, wherein the inner electrode and the outer electrode define an active area for ion conduction and wherein the active area is positioned in closer proximity to the exhaust opening of the tube than the inlet opening of the tube.

4. The fuel cell system of claim 3, wherein the active area is disposed downstream from and proximate to the catalytic substrate.

5. The fuel cell system of claim 1, wherein the spacer element substantially prevents unreformed fuel from contacting nickel of the anode.

6. The solid oxide fuel cell of claim 1, wherein the catalytic substrate comprises a supported catalyst.

7. The fuel cell system of claim 1, further comprising a manifold member defining an inner chamber, said manifold member being configured to route fluid to the inlet end of the fuel cell tube, wherein the anode current collector extends to the inner chamber of the manifold member.

8. The fuel cell system of claim 1, wherein anode current collector comprises a brush portion.

9. The fuel cell system of claim 1, wherein the brush portion comprises loop members contacting the anode of the tube.

10. The fuel cell system of claim 1, wherein the catalytic substrate is disposed proximate to the active area of the tube.

11. A solid oxide fuel cell comprising:

a plurality of tubes, each comprising an inlet opening, an exhaust opening, an electrolyte, an anode positioned interiorly from the electrolyte, and a cathode positioned exteriorly from the electrolyte;

a spacer element disposed within each tube;

a catalytic substrate disposed within each spacer element, the catalytic substrate being configured to receive unreformed fuel and to convert the unreformed fuel to reformed fuel; and an anode current collector contacting the anode of each tube and providing an electrical current path inside the tube past the catalytic substrate to the inlet opening.

12. The fuel cell system of claim 11, further comprising a manifold member having an inner chamber configured to route fluid to each of the plurality of tubes, wherein each anode current collector extends to the inner chamber of the manifold member and wherein a first tube is electrically connected to a second tube by a wire extending through the manifold member.

13. The solid oxide fuel cell of claim 11, wherein each catalytic substrate defines an opening and wherein each anode current collector is received through the opening.

14. The fuel cell system of claim 11, wherein the inner electrode and the outer electrode of each tube define an active area for ion conduction and wherein the active area is positioned in closer proximity to the exhaust opening of the tube than the inlet opening of each tube.

15. The fuel cell system of claim 11, wherein the active area is disposed downstream from and proximate to the catalytic substrate.

16. The fuel cell system of claim 11, wherein the spacer element substantially prevents unreformed fuel from contacting nickel of the anode.

17. The solid oxide fuel cell of claim 11, wherein the catalytic substrate comprises a supported catalyst.

18. The fuel cell system of claim 11, wherein anode current collector comprises a brush portion.

19. The fuel cell system of claim 11, wherein the brush portion comprises loop members contacting the anode of the tube.

20. The fuel cell system of claim 1, wherein the catalytic substrate is disposed proximate to the active area of the tube.

* * * * *